(12) United States Patent
Hadj Romdhane et al.

(10) Patent No.: US 7,906,052 B2
(45) Date of Patent: Mar. 15, 2011

(54) REINFORCED ION-CONDUCTIVE MEMBRANES

(75) Inventors: Ilyess Hadj Romdhane, Woodbury, MN (US); Scott L. Ciliske, Saint Paul, MN (US)

(73) Assignee: 3M Innovative Properties Company, Saint Paul, MN (US)

(*) Notice: Subject to any disclaimer, the term of this patent is extended or adjusted under 35 U.S.C. 154(b) by 59 days.

(21) Appl. No.: 12/340,899

(22) Filed: Dec. 22, 2008

(65) Prior Publication Data
US 2009/0123641 A1    May 14, 2009

Related U.S. Application Data

(62) Division of application No. 11/295,764, filed on Dec. 7, 2005.

(51) Int. Cl.
    *B29C 41/32* (2006.01)
(52) U.S. Cl. .................. 264/171.1; 264/173.12
(58) Field of Classification Search ........... 264/171.1, 264/173.12
    See application file for complete search history.

(56) References Cited

U.S. PATENT DOCUMENTS

| | | |
|---|---|---|
| 4,865,930 A | 9/1989 | Kindler et al. |
| 5,094,895 A | 3/1992 | Branca et al. |
| 5,654,109 A | 8/1997 | Plowman et al. |
| 5,795,668 A | 8/1998 | Banerjee |
| 6,248,469 B1 | 6/2001 | Formato et al. |
| 6,277,512 B1 * | 8/2001 | Hamrock et al. .............. 429/33 |
| 6,624,328 B1 | 9/2003 | Guerra |
| 6,736,971 B2 * | 5/2004 | Sale et al. ................. 264/41 |
| 6,737,158 B1 | 5/2004 | Thompson |
| 2002/0045085 A1 | 4/2002 | Formato et al. |
| 2003/0082431 A1 | 5/2003 | Klitsner et al. |
| 2003/0152820 A1 | 8/2003 | Kato |
| 2004/0005474 A1 | 1/2004 | Charnock et al. |
| 2004/0036394 A1 | 2/2004 | Hamrock et al. |
| 2004/0121210 A1 | 6/2004 | Hamrock et al. |
| 2004/0175506 A1 | 9/2004 | Ebbrell et al. |
| 2005/0058821 A1 | 3/2005 | Smith et al. |

OTHER PUBLICATIONS

Stefan Haufe and Ulrich Stimming, "Proton Conducting Membranes Based on Electrolyte Filled Microporous Matrices", Journal of Membrane Science, 185(2001), pp. 95-103, Garching, Germany.

Steven Swier, et al., "Polymer Blends Based on Sulfonated Poly (Ether Ketone Ketone) and Poly (Ether Sulfone) as Proton Exchange Membranes for Fuel Cells", Journal of Membrane Science, 2005, pp. 1-12, Connecticut Storrs, CT, USA.

Qingfeng Li, et al., "Approaches and Recent Development of Polymer Electrolyte Membranes for Fuel Cells Operating Above 100° C.", Chem. Mater, 2003, 15. pp. 4896-4915, Lyngby, Denmark.

* cited by examiner

*Primary Examiner* — Yogendra N Gupta
*Assistant Examiner* — Alison Hindenlang
(74) *Attorney, Agent, or Firm* — Philip Y. Dahl

(57) ABSTRACT

An ion-conductive membrane that includes a first layer comprising a first ionomer, and a porous polymer substrate, where at least a portion of the first ionomer is interpenetrated within the porous polymer substrate by ionomer-induced phase separation.

15 Claims, 4 Drawing Sheets

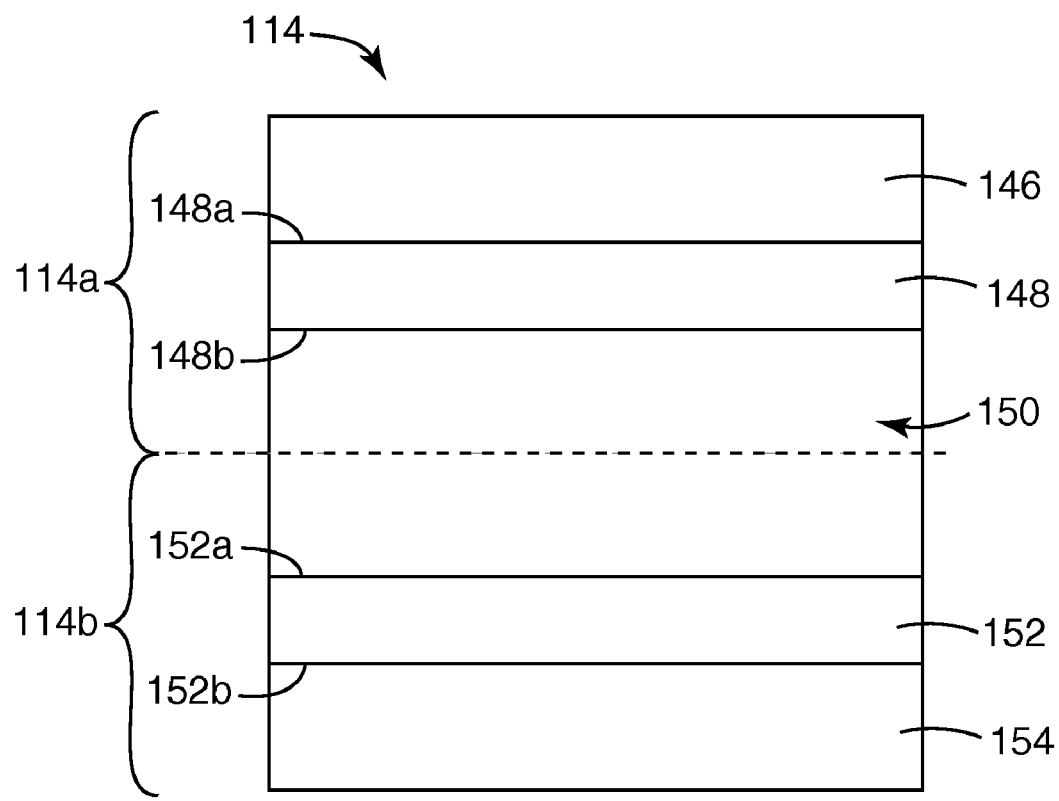
Fig. 5
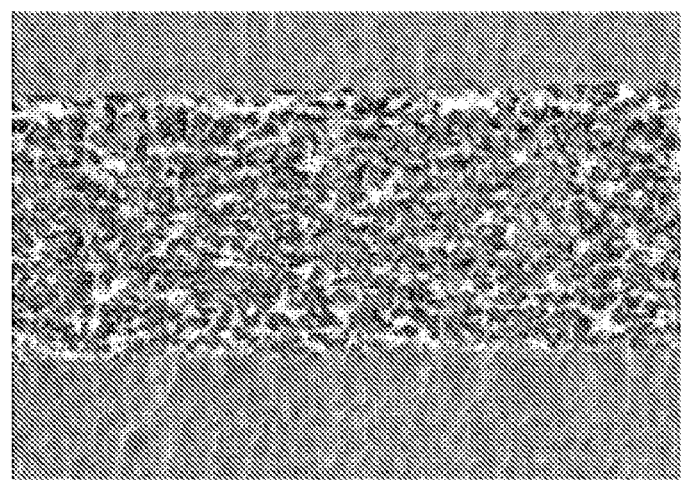
Fig. 6 ‾1.67 μm‾

US 7,906,052 B2

REINFORCED ION-CONDUCTIVE MEMBRANES

CROSS REFERENCE TO RELATED APPLICATION

This application is a divisional of U.S. Ser. No. 11/295,764, filed Dec. 7, 2005, now pending, the disclosure of which is incorporated by reference in its entirety herein.

FIELD OF THE INVENTION

The present invention relates to ion-conductive membranes (ICMs) for electrochemical applications. In particular, the present invention relates to reinforced ICMs formed with multilayer coating and phase-inversion technologies.

BACKGROUND OF THE INVENTION

ICMs are used as electrolyte membranes in a variety of electrochemical applications, such as electrochemical devices (e.g., fuel cells), chloroalkali applications, and vapor permeation/separation applications. With respect to fuel cells, ICMs may function as electrolyte membranes capable of transferring protons (e.g., proton-exchange membranes). ICMs are particularly suitable in fuel cell applications because they may replace hazardous acidic liquid electrolytes, such as those used in phosphoric acid fuel cells.

A fuel cell such as a proton-exchange membrane fuel cell typically contains a membrane electrode assembly (MEA), which is a catalyst coated membrane disposed between a pair of gas diffusion layers. The catalyst coated membrane itself typically includes an electrolyte membrane disposed between a pair of catalyst layers, where an ICM may function as the electrolyte membrane. The respective sides of the electrolyte membrane are referred to as an anode portion and a cathode portion. In a typical proton-exchange membrane fuel cell, hydrogen fuel is introduced into the anode portion, where the hydrogen reacts and separates into protons and electrons. The electrolyte membrane transports the protons to the cathode portion, while allowing a current of electrons to flow through an external circuit to the cathode portion to provide power. Oxygen is introduced into the cathode portion and reacts with the protons and electrons to form water and heat.

ICMs used in the above-discussed applications typically require adequate mechanical strengths (e.g., tear resistance). Previous attempts to enhance the mechanical strengths of ICMs involved increasing the thicknesses of the membranes. However, increases in membrane thicknesses generally decrease the ion conductivities of such membranes. Moreover, membranes that are inherently weak at small thicknesses (e.g., less than about 50 micrometers) require reinforcement with additional materials, which also undesirably cause the resulting membrane to have increased thicknesses and reduced ion conductivity.

BRIEF SUMMARY OF THE INVENTION

The present invention relates to an ICM and methods of making ICMs. The ICM includes a first layer comprising a first ionomer, and a porous polymer substrate, where at least a portion of the first ionomer is interpenetrated within the porous polymer substrate by ionomer-induced phase separation. The ICM is mechanically reinforced and exhibits good ion conductivity for use in a variety of electrochemical applications.

BRIEF DESCRIPTION OF THE DRAWINGS

FIG. 5 is a schematic sectional view of an alternative ion-conductive membrane of the present invention.

FIG. 6 is an SEM micrograph of an exemplary ICM of the present invention.

While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale. Like reference numbers have been used throughout the figures to denote like parts.

DETAILED DESCRIPTION

Figure 1:
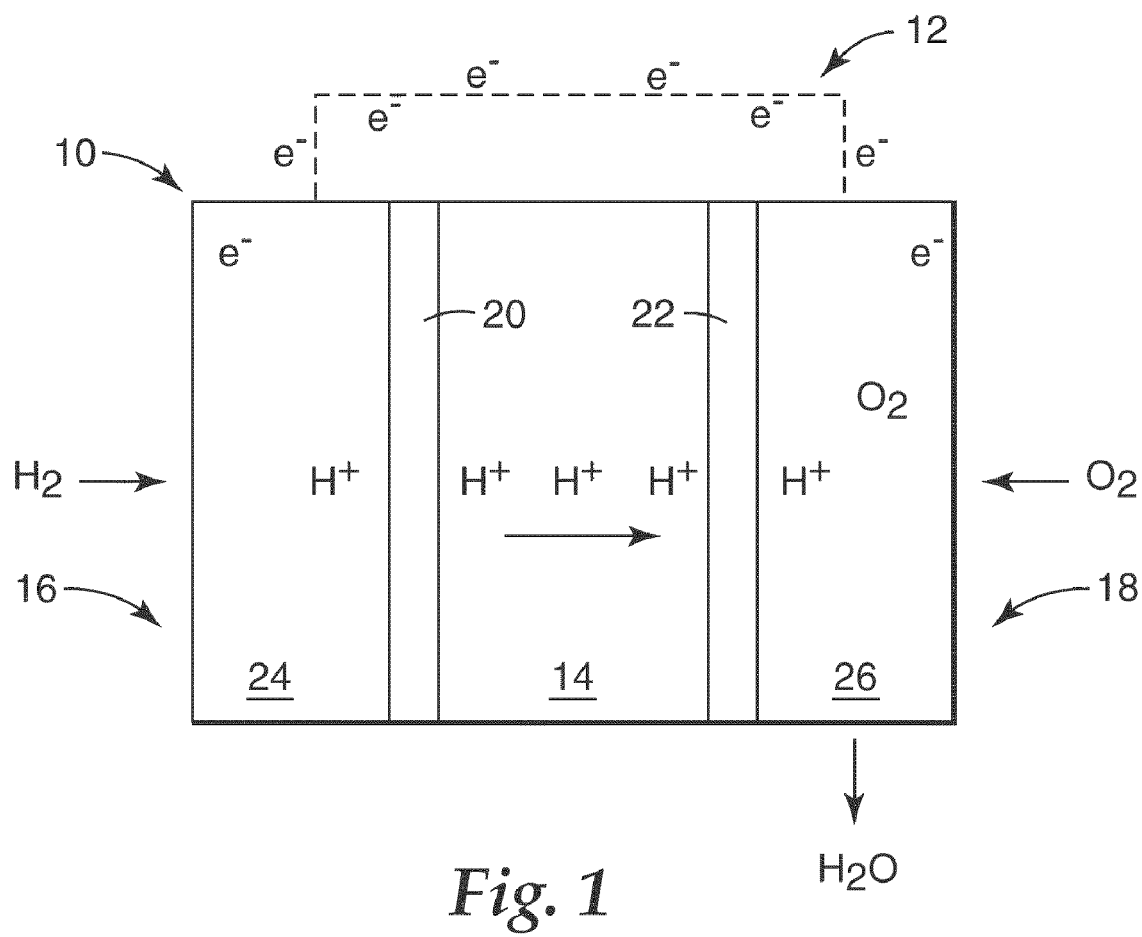
FIG. 1 is a schematic illustration of a membrane electrode assembly of the present invention in use with an external electrical circuit.

FIG. 1 is an illustration of MEA 10 in use with external electrical circuit 12, where MEA 10 includes ICM 14 of the present invention. MEA 10 is suitable for use in electrochemical cells, such as proton-exchange membrane fuel cells, and further includes anode portion 16, cathode portion 18, catalyst layers 20 and 22, and gas diffusion layers 24 and 26. Anode portion 16 and cathode portion 18 generally refer to the anode and cathode sides of MEA 10.

ICM 14 is a proton-exchange membrane disposed between catalyst layers 20 and 22, where ICM 14 and catalyst layers 20 and 22 may be a catalyst coated membrane. As discussed below, ICM 14 is mechanically reinforced and exhibits good proton conductivity. This allows ICM 14 to resist damage during manufacture and use of MEA 10, while also readily allowing protons to transfer between anode portion 16 and cathode portion 18.

While the present disclosure focuses on ICM 14 as a proton-exchange membrane in MEA 10, ICMs of the present invention may alternatively be used as electrolyte membranes in a variety of electrochemical applications. For example, ICMs of the present invention may be conductive of only ions either of positive charge (i.e., cation-exchange membrane) or negative charge (i.e., anion-exchange membrane), or of only one type of ion (e.g., proton-exchange membrane).

Catalyst layer 20 is disposed between ICM 14 and gas diffusion layer 24, where gas diffusion layer 24 is located at anode portion 16 of MEA 10. Similarly, catalyst layer 22 is disposed between ICM 14 and gas diffusion layer 26, where gas diffusion layer 26 is located at cathode portion 18 of MEA 10. Gas diffusion layers 24 and 26 may each be any suitable electrically conductive porous substrate, such as carbon fiber constructions (e.g., woven and non-woven carbon fiber constructions). Gas diffusion layers 24 and 26 may also be treated to increase or impart hydrophobic properties.

During operation of MEA 10, hydrogen fuel ($H_2$) is introduced into gas diffusion layer 24 at anode portion 16. MEA 10 may alternatively use other fuel sources, such as methanol, ethanol, formic acid, and reformed gases. The fuel passes through gas diffusion layer 24 and over catalyst layer 20. At catalyst layer 20, the fuel is separated into hydrogen ions ($H^+$) and electrons ($e^-$). ICM 14 only permits the hydrogen ions to pass through to reach catalyst layer 22 and gas diffusion layer 26. The electrons generally cannot pass through ICM 14. As such, the electrons flow through external electrical circuit 12 in the form of electric current. This current can power an electric load, such as an electric motor, or be directed to an energy storage device, such as a rechargeable battery. Oxygen ($O_2$) is introduced into gas diffusion layer 26 at cathode portion 18. The oxygen passes through gas diffusion layer 26 and over catalyst layer 22. At catalyst layer 22, oxygen, hydrogen ions, and electrons combine to produce water and heat.

Figure 2:
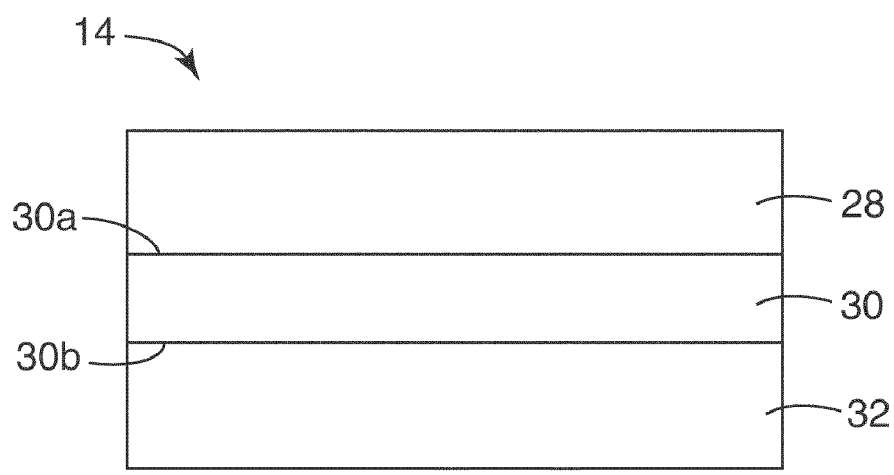
FIG. 2 is a schematic sectional view of an ion-conductive membrane of the present invention.

FIG. 2 is a schematic sectional view of ICM 14, which oriented perpendicularly to the view shown in FIG. 1. As shown in FIG. 2, ICM 14 is a multilayer membrane that includes anode layer 28, substrate 30, and cathode layer 32. Substrate 30 includes first surface 30a and second surface 30b, where anode layer 28 is disposed adjacent first surface 30a and cathode layer 32 is disposed adjacent second surface 30b. The references to "anode" and "cathode" for anode layer 28 and cathode layer 32 are used for ease of discussion to show relative locations (i.e., anode layer 28 is disposed adjacent catalyst layer 20 shown in FIG. 1, and cathode layer 32 is disposed adjacent catalyst layer 22 also shown in FIG. 1).

Substrate 30 is a porous polymer substrate that compositionally includes one or more reinforcement polymers having a microporous infrastructure (i.e., a plurality of micropores distributed throughout the structure of the reinforcement polymer). As discussed below, the micropores are interpenetrated with ionomers from anode layer 28 and cathode layer 32. The ionomers desirably interpenetrate at least a majority of the micropores of substrate 30, and more desirably interpenetrate substantially all of the micropores of substrate 30. Moreover, the ionomers desirably interpenetrate substrate 30 in a substantially uniform manner, which provides an even distribution of the ionomers throughout substrate 30. The interpenetrated ionomers allow substrate 30 to assist anode layer 28 and cathode layer 32 in conducting protons through ICM 14. Otherwise, substrate 30 would effectively function as a barrier to proton transfer through ICM 14.

The reinforcement polymer of substrate 30 is used to mechanically reinforce ICM 14. In the absence of substrate 30, a proton-exchange membrane formed from anode layer 28 and/or cathode layer 32 would exhibit good proton conductivity. However, the proton-exchange membrane would also have low structural integrity, increasing the risk of damage during manufacture and use. The use of substrate 30, interpenetrated with ionomers, allows ICM 14 to have a combination of good mechanical strength and proton conductivity.

The reinforcement polymer of substrate 30 is also desirably thermally stable, which allows the reinforcement polymer to retain its microporous infrastructure during drying and annealing operations. Suitable thermally stable reinforcement polymers desirably have glass transition temperatures of at least about 180° C., more desirably of at least about 200° C., and even more desirably of at least about 215° C.

Examples of suitable materials for the reinforcement polymer of substrate 30 include polysulfones, polyether imides, polyethersulfones, polytetrafluoroethylenes (PTFE), terpolymers of PTFE, polyphenylene sulfides, polyetheretherketones, fluorinated ethylene-propylenes, polyvinylidenedifluorides, hexafluoropropylenes, vinylidene fluorides (THV), ultra-high-molecular weight polyethylenes, liquid crystalline polyesters, and combinations thereof. Such materials mechanically reinforce ICM 14 and are thermally stable. Examples of particularly suitable materials for the reinforcement polymer of substrate 30 include polysulfones and polyether imides which provide good mechanical strengths and have high glass transition temperatures. In one embodiment, the reinforcement polymer may also be sulfonated to increase proton conductivity.

Anode layer 28 and cathode layer 32 each compositionally include one or more ionomers, which allow anode layer 28 and cathode layer 32 to function as proton-transfer skins at the anode and cathode sides of ICM 14. As discussed below, during the formation of ICM 14, ionomers from anode layer 28 and cathode layer 32 interpenetrate within substrate 30 by ionomer-induced phase separation. This secures anode layer 28 and cathode layer 32 to substrate 30 (reducing the risk of interlayer delamination) and allows substrate 30 to conduct protons.

Examples of suitable ionomers for each of anode layer 28 and cathode layer 32 include proton-exchange membrane ionomers, such as film-forming fluoropolymers having pendant acid groups (e.g., phosphonyl, carbonyl, and sulfonyl groups). Examples of suitable pendent groups include sulfonic acid groups having the formula $-R^1-SO_3Y$, where $R^1$ may be a branched or unbranched perfluoroalkyl, perfluoroalkoxy, or perfluoroether group, which contains 1-15 carbon atoms and 0-4 oxygen atoms, and where Y is a hydrogen ion, a cation, or combinations thereof. Examples of particularly suitable pendant groups include $-OCF_2CF(CF_3)OCF_2CF_2SO_3Y$, $-O(CF_2)_4SO_3Y$, and combinations thereof.

The suitable film-forming fluoropolymers may also include one or more acidic endgroups, such as sulfonyl endgroups having the formula $-SO_3Y$. The backbone chain of the acidic polymer may be partially or fully fluorinated. Suitable fluorine concentrations in the backbone chain include about 40% or more by weight, based on the entire weight of the backbone chain. In one embodiment of the present invention, the backbone chain of the fluoropolymer is perfluorinated.

Examples of particularly suitable ionomer materials for each of anode layer 28 and cathode layer 32 include perfluorosulfonic acid copolymers with 800-1000 equivalent weights of gaseous tetrafluoroethylene comonomer (TFE) having a formula $CF_2=CF_2$ and a molecular weight of 100.02, and a sulfonyl fluoride comonomer (MV4S) having a formula $CF_2=CFO(CF_2)_4SO_2F$ and a molecular weight of 378.11, where the MV4S was prepared as described in U.S. Pat. No. 6,624,328 (in a hydrolyzed sulfonic acid form), and where the perfluorosulfonic acid copolymer was prepared as described in U.S. Patent Application No. 2004/0121210, and which is manufactured by 3M Corporation, St. Paul, Minn.

Anode layer 28 and cathode layer 32 may include the same ionomers, or alternatively, may include different ionomers. For example, anode layer 28 and cathode layer 32 may include ionomers having different equivalent weights. Lower equivalent weight ionomers have more acid groups, but are believed to cause swelling in water. The use of higher equivalent weight ionomers in one of anode layer 28 and cathode layer 32, and lower equivalent weight ionomers in the opposing layer provides a balance of increased proton conductivity, good mechanical strength, and low swelling with water.

ICM 14 may be formed by initially dissolving or dispersing the reinforcement polymer and the ionomers in solvents to form solutions. The solutions used to form anode layer 28, substrate 30, and cathode layer 32 are respectively referred to herein as ionomer solution 28s, reinforcement polymer solution 30s, and ionomer solution 32s. The term "solution" is herein defined to include full dissolutions, partial dissolutions, and dispersions. Preferably, the reinforcement polymer used to provide reinforcement polymer solution 30s is substantially dissolved in the corresponding solvent to further promote the ionomer-induced phase separation.

Suitable solvents for each of ionomer solution 28s, reinforcement polymer solution 30s, and ionomer solution 32s include any carrier fluid suitable for forming solutions with the reinforcement polymer and the ionomers. Examples of suitable solvents include 1-methyl-2-pyrrolidinone (NMP), dimethylacetamide, alcohols (e.g., methanol and n-propanol), and combinations thereof. NMP is particularly suitable for polymer solution 30s because it contributes sufficient free volume in the composition to readily remove residual solvents, thereby reducing the risk of blistering during a drying operation. Additionally, NMP is a good solvent for dissolving reinforcement polymers such as polysulfones and polyether imides, and is a good coalescing agent for ionomers. Examples of suitable concentrations for each of the reinforcement polymer and the ionomers in their respective solutions range from about 5% to about 50% by weight, with particularly suitable concentrations ranging from about 10% to about 30% by weight, based on the entire weight of the given solution.

In one embodiment, reinforcement polymer solution 30s may be a metastable solution, where one or more ionomers are dispersed in the solvent with the dissolved reinforcement polymer. Such solutions provide better coating characteristics and are believed to enhance ionomer interpenetration. Examples of suitable concentrations of ionomers dispersed in the metastable solution range from about 10% to about 20% on a dry weight basis.

Reinforcement polymer solution 30s may be cast as a layer and coated on each side with ionomer solutions 28s and 32s, respectively. The coatings may be performed in any suitable manner, which may include wet casting, extrusion processes, knife coating, slide coating, curtain coating, meniscus coating, as well as wet-on-wet (i.e. multiple coating heads with no drying in between) coating methods including wet-on-wet slide, curtain and meniscus coating and other multilayer processes. Upon coating, the ionomers in ionomer solutions 28s and 32s cause the reinforcement polymer to phase separate from the solvent of reinforcement polymer solution 30s by ionomer-induced phase separation. The phase separation causes the reinforcement polymer to precipitate out of the solvent, thereby forming substrate 30 with the microporous infrastructure.

While not wishing to be bound by theory, the phase separation is believed to proceed by a spinodal decomposition mechanism, where ionomer solutions 28s and 32s act as coagulants that interpenetrate the newly formed micropores from each side of substrate 30. Upon drying, the solvents from ionomer solutions 28s and 32s and reinforcement polymer solution 30s are evaporated. The solvent evaporation further promotes the phase separation and locks the interpenetrating ionomers within the micropores of substrate 30. The remaining ionomers of ionomer solutions 28s and 32s that did not interpenetrate substrate 30 respectively form anode layer 28 and cathode layer 32.

The resulting ICM 14 is mechanically reinforced by the reinforcement polymer of substrate 30, and exhibits good proton conductivity from the ionomers of anode layer 28, cathode layer 32, and the ionomers interpenetrated within substrate 30. The ionomer-induced phase separation allows substrate 30 to be filled with ionomer materials in a single-step process, and provides for a more uniform filling of the micropores compared to standard techniques of impregnating ionomers within pre-formed porous polymers.

Figure 3:
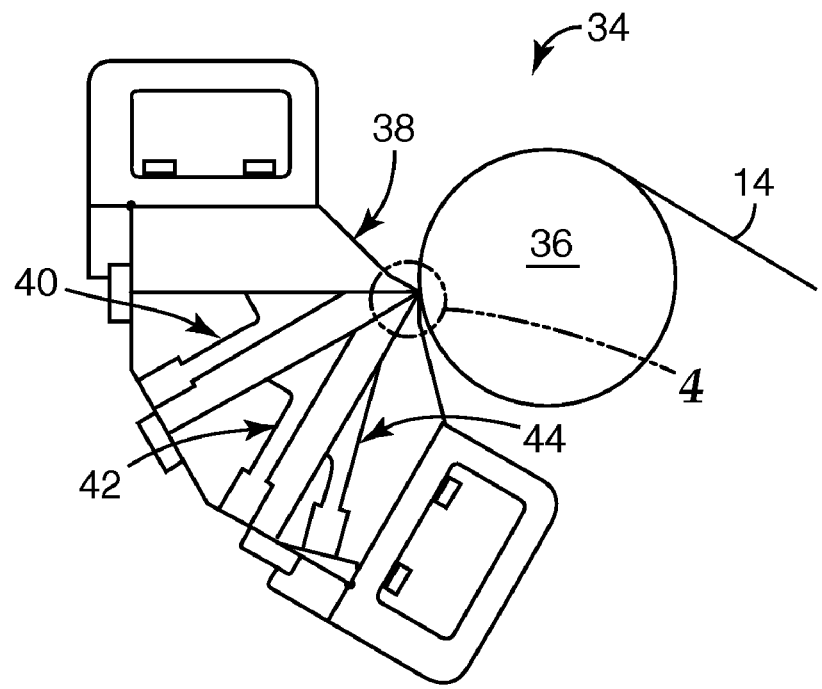
FIG. 3 is a schematic illustration of tri-die system for manufacturing the ion-conductive membrane of the present invention.

FIG. 3 is a schematic illustration showing tri-die system 34, which is a three-layer coextrusion system suitable for wet casting ICM 14 in a continuous process. As shown, tri-die 34 includes drum wheel 36 and extrusion head 38. Drum wheel 36 is a rotatable wheel that receives extruded layers from extrusion head 38. Drum wheel 36 desirably includes a low-stick liner (e.g., polyimide) to support ICM 14 during the coextrusion and drying operations. Extrusion head 38 includes extrusion slots 40, 42, and 44, which are pathways for coextruding ionomer solution 28s, reinforcement polymer solution 30s, and ionomer solution 32s, respectively. The desired slot height is established by placing precision metal shims of the necessary thickness between the bars of the die, which are notched to the correct width and depth (not shown). For example, reinforcement polymer solution 30s may be introduced into extrusion slot 42 to subsequently form substrate 30. Similarly, ionomer solutions 28s and 30s may be respectively introduced into extrusion slots 40 and 44 to subsequently form anode layer 28 and cathode layer 32 on opposing surfaces of substrate 30.

Figure 4:
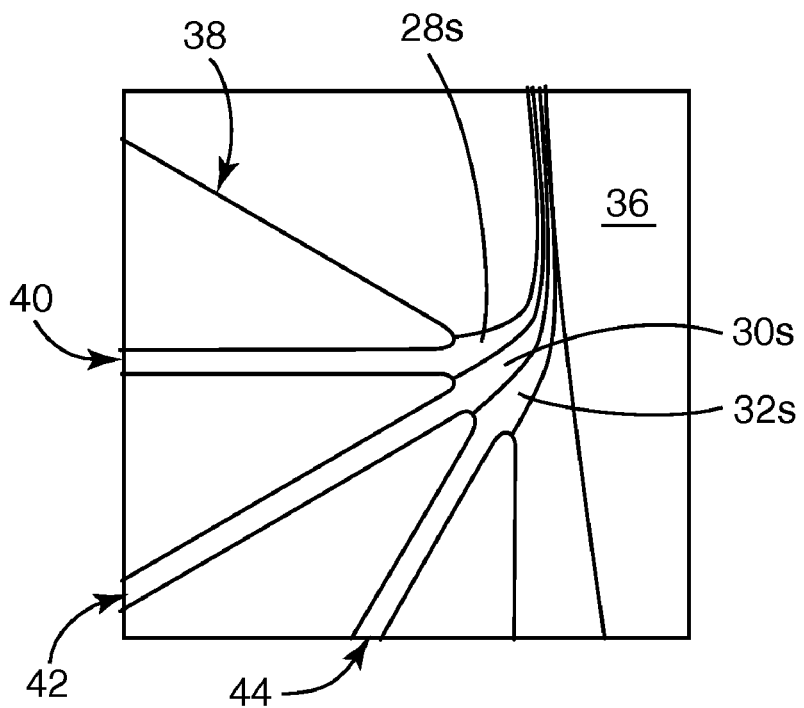
FIG. 4 is an expanded view of section 4 taken in FIG. 3.

FIG. 4 is an enlarged detail view of section 4 taken in FIG. 3, which shows ionomer solution 28s, reinforcement polymer solution 30s, and ionomer solution 32s being respectively extruded from extrusion slots 40, 42, and 44. The resulting multilayer film is then wound around drum wheel 36 in a clock-wise direction and supported on a liner, as discussed above. Examples of extrusion rates of each of ionomer solution 28s, reinforcement polymer solution 30s, and ionomer solution 32s range from about one meter/minute to about three meters/minute.

As the layers of ionomer solution 28s, reinforcement polymer solution 30s, and ionomer solution 32s are extruded, ionomer solution 28s contacts reinforcement polymer solution 30s from the top side and ionomer solution 32s contacts reinforcement polymer solution 30s from the bottom side, as shown in FIG. 4. As a result, ionomer-induced phase separations occur from each side of the layer of reinforcement polymer solution 30s. Ionomer solution 28s induces a first portion of the reinforcement polymer to phase separate from the solvent of reinforcement polymer solution 30s, thereby forming micropores within the reinforcement polymer. Ionomer solution 28s then interpenetrates into the micropores from the top side.

In a substantially simultaneous manner, ionomer solution 32s induces a second portion of the reinforcement polymer to phase separate from the solvent of reinforcement polymer solution 30s, thereby forming additional micropores within the reinforcement polymer. Ionomer solution 32s interpenetrates into the additional micropores from the bottom side.

The extruded film may then be dried to evaporate the solvents by passing the film along a series of drying zones that incrementally increase in temperature. Examples of suitable zones temperatures range from about 50° C. to about 180° C. Examples of suitable line speeds during the drying operation are generally dependent on the length of the drying oven, and range from about one meter/minute to about three meters/minute. During the drying operation, the solvents evaporate, thereby allowing the ionomers to become locked within the porous infrastructure of substrate 30. After the solvents have substantially evaporated, ICM 14 is ready for post-formation manufacturing steps, such as annealing, cleaning, gasket sealing, and construction of MEA 10.

Tri-die system 34 is also particularly beneficial for wet casting films that have low membrane thicknesses upon drying. Lower membrane thicknesses for ICM 14 allow for lower internal mass-transfer resistances and reduce material costs, without compromising mechanical strength. In addition, because of back-diffusion of water from cathode portion 18 to the anode portion 16 through such thin membranes, water management during fuel cell operation can be improved. This correspondingly improves the proton conductivity of MEA 10. Examples of suitable membrane thicknesses for ICM 14 include thicknesses less than about 30 micrometers, with particularly suitable membrane thicknesses including thicknesses less than about 15 micrometers, and with even more particularly suitable membrane thicknesses including thicknesses less than about 10 micrometers.

Based on the relative sizes of extrusion slots 40, 42, and 44, and the extrusion rates and line speeds used, the relative layer thicknesses of anode layer 28, substrate 30, and cathode layer 32 may also vary. Examples of suitable layer thickness ratios of each of anode layer 28 and cathode layer 32 compared to substrate 30 range from about 1:1 to about 5:1, with particularly suitable layer thickness ratios ranging from about 2:1 to about 3:1. For example, suitable layer thicknesses for anode layer 28, substrate 30, and cathode layer 32 may respectively include 7 micrometers, 2.5 micrometers, and 7 micrometers. Additionally, extrusion slots 40 and 44 and/or the solution flow rates may be varied such that anode layer 28 and cathode layer 32 have differing layer thicknesses. Initially, three slot heights were used: 250, 180 and 125 microns, with 250 microns being particularly effective at 3 mpm for final thicknesses of less than 20 microns. All shim notches were 125 mm in width.

Thick layers for substrate 30 yield stronger membranes (higher tear strength), but suffer a reduced level of proton conductivity due to interfacial delamination and/or incomplete phase separation. Accordingly, examples of suitable layer thicknesses for substrate 30 include thicknesses of about 5 micrometers or less, with particularly suitable layer thicknesses including thicknesses of about 3 micrometers or less. Such layer thicknesses allow substrate 30 to provide good mechanical strength to ICM 14, while also providing good proton conductivity.

FIG. 5 is a schematic sectional view of ICM 114, which is an alternative proton-exchange membrane suitable for use in MEA 10. As shown, ICM 114 is similar to ICM 14, except that ICM 114 is a five-layer membrane that includes anode layer 146, anode substrate 148, core layer 150, cathode substrate 152, and cathode layer 154. ICM 114 may also be dimensionally bisected into top half 114a and bottom half 114b, where each of top half 114a and bottom half 114b generally resemble ICM 14. ICM 114 is beneficial where thick proton-exchange membranes are desired. As discussed above, thick proton-exchange membranes generally reduce the proton conductivities of the given membranes. However, ICM 114 may attain large membrane thicknesses while preserving good proton conductivity.

Anode substrate 148 includes first surface 148a and second surface 148b, where anode layer 146 is disposed adjacent first surface 148a and core layer 150 is disposed adjacent second surface 148b. Similarly, cathode substrate 152 includes first surface 152a and second surface 152b, where core layer 150 is disposed adjacent first surface 152a and cathode layer 154 is disposed adjacent second surface 152b. Similar to the discussion above, the references to "anode" and "cathode" are used for ease of discussion to show relative locations.

Anode substrate 148 and cathode substrate 152 are porous polymer substrates that provide mechanical reinforcement for ICM 114. Anode substrate 148 and cathode substrate 152 compositionally each include one or more reinforcement polymers having a microporous infrastructure, similar to substrate 30 discussed above in FIG. 2. Examples of suitable reinforcement polymers for anode substrate 148 and cathode substrate 152 are the same as those discussed above for substrate 30.

Anode layer 146 and cathode layer 154 function as proton-transport skins at the anode and cathode sides of ICM 114. Anode layer 146 and cathode layer 154 each compositionally include one or more ionomers, similar to anode layer 28 and cathode layer 32 discussed above in FIG. 2. Examples of suitable ionomers for anode layer 146 and cathode layer 154 are the same as those discussed above for anode layer 28 and cathode layer 32.

Core layer 150 compositionally also includes one or more ionomers, and functions as a proton-transport core region of ICM 114. This allows ICM 114 to achieve greater membrane thicknesses without sacrificing proton conductivity. Examples of suitable ionomers for core layer 150 are also the same as those discussed above for anode layer 28 and cathode layer 32. A particularly suitable arrangement for ICM 114 includes using high equivalent weight ionomers for anode layer 146 and cathode layer 154, and a low equivalent weight ionomer for core layer 150. This arrangement provides a combination of high mechanical strengths and good proton conductivity.

Examples of suitable membrane thicknesses for ICM 114 include thicknesses less than about 60 micrometers, with particularly suitable membrane thicknesses including thicknesses less than about 50 micrometers, and with even more particularly suitable membrane thicknesses including thicknesses less than about 40 micrometers. Examples of suitable layer thicknesses for anode substrate 148 and cathode substrate 152 are the same as those discussed above for substrate 30. Similarly, examples of suitable layer thickness ratios of each of anode layer 146 and cathode layer 154 compared to anode substrate 148 and cathode substrate 152 are the same as discussed above for anode layer 28 and cathode layer 32.

ICM 114 may be formed with larger membrane thicknesses because, in part, the relative amounts of ionomer-to-reinforcement polymer are generally the same as the relative amounts used for ICM 14, discussed above. As a result, ionomers are interpenetrated within anode substrate 148 and cathode substrate 152 in a substantially uniform manner. This allows anode substrate 148 and cathode substrate 152 to assist anode layer 146, core layer 150, and cathode layer 154 in transferring protons through ICM 114.

ICM 114 may be formed in a dual-casting process using tri-die system 34, discussed above in FIGS. 3 and 4. Bottom half 114b of ICM 114 may initially be cast from tri-die system 34 in the same manner as discussed above for ICM 14. Bottom half 114b may then be dried to promote ionomer-induced phase separation of the reinforcement polymer of cathode substrate 152 with the ionomers from half of core layer 150 and cathode layer 154. The solvents may be fully evaporated or partially evaporated during this drying operation. Top half 114a may then be cast from tri-die system 34 on top of the previously cast bottom half 114b. The entire membrane of ICM 114 may then undergo a second drying operation to promote ionomer-induced phase separation of the reinforcement polymer of anode substrate 148 with the ionomers from anode layer 146 and the second half of core layer 150. Laminating top half 114a on top of bottom half 114b allows the ionomers of each half of core layer 150 to blend together to form core layer 150. This secures top half 114a to bottom half 114b to form ICM 114. The resulting ICM 114 may then undergo post-formation manufacturing steps, such as cleaning, gasket sealing, and construction of MEA 10.

Alternatively, ICM 114 may be formed with a fuel cell lamination technique, which may initially involve obtaining a pair of ICMs 14 wet cast with tri-die system 34, as discussed above in FIGS. 3 and 4, and releasing each of the pair of ICMs 14 from the respective low-stick liner. This may be facilitated by humidification or immersion in ambient water. The pair of ICMs 14 may then be placed between a pair of 50-micrometer silicone liner sheets. The resulting assembly may then introduced between two rolls in a hot roll laminator where the top roll is preheated at about 140° C., the bottom roll at about 132° C., and the pressure is set at about 3.4 MegaPascals (about 500 pounds/inch$^2$), to produce ICM 114. During this lamination procedure, enhanced pore filling with the ionomers may be achieved by stretching the resulting ICM 114. ICM 114 may then undergo post-formation manufacturing steps, as discussed above.

In alternative embodiments, different numbers of layers may be used to form ICMs of the present invention from those discussed above. For example, in one embodiment, a single ionomer layer may be laminated on a substrate. In this embodiment, the ionomer-induced phase separation may be allowed to continue until ionomers interpenetrate within the substrate in a substantially uniform manner.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

The following compositional abbreviations are used in the following Examples:

"Polysulfone": A polysulfone having the repeating unit [—O—Ph-C(CH$_3$)$_2$-Ph-O-Ph-SO$_2$-Ph-], where "Ph" represents a phenyl ring, and which is commercially available from Sigma-Aldrich Company, Saint Louis, Mo.

"3M 800 PFSA": A perfluorosulfonic acid copolymer with an 800 equivalent weight of gaseous tetrafluoroethylene comonomer (TFE) having a formula CF$_2$=CF$_2$ and a molecular weight of 100.02, and a sulfonyl fluoride comonomer (MV4S) having a formula CF$_2$=CFO(CF$_2$)$_4$SO$_2$F and a molecular weight of 378.11, where the MV4S was prepared as described in U.S. Pat. No. 6,624,328 (in a hydrolyzed sulfonic acid form), and where the perfluorosulfonic acid copolymer was prepared as described in U.S. Patent Application No. 2004/0121210, and which is manufactured by 3M Corporation, St. Paul, Minn.

"3M 1000 PFSA": A perfluorosulfonic acid copolymer with a 1000 equivalent weight of gaseous tetrafluoroethylene comonomer (TFE) having a formula CF$_2$=CF$_2$ and a molecular weight of 100.02, and a sulfonyl fluoride comonomer (MV4S) having a formula CF$_2$=CFO(CF$_2$)$_4$SO$_2$F and a molecular weight of 378.11, where the MV4S was prepared as described in U.S. Pat. No. 6,624,328 (in a hydrolyzed sulfonic acid form), and where the perfluorosulfonic acid copolymer was prepared as described in U.S. Patent Application No. 2004/0121210, and which is manufactured by 3M Corporation, St. Paul, Minn.

"NMP": 1-methyl-2-pyrrolidinone solvent commercially available from Sigma-Aldrich Company, Saint Louis, Mo.

Examples 1A-8

ICMs for Examples 1A-8 were prepared pursuant to the following procedure using a Coater/Drier pilot line. The ICMs were wet cast from a tri-die system having an upper slot (for a first ionomer layer), a middle slot (for a substrate), and a lower slot (for a second ionomer layer). Dispersions of 20% 3M 1000 PFSA in a solvent blend of water and n-propanol were fed to the upper and lower slots with infuse/withdraw syringe pumps (commercially available under the trade designation "PHD 2000" from Harvard Apparatus, Holliston, Mass.). A solution of 15% polysulfone in NMP was fed to the middle slot also with an infuse/withdraw syringe pump. The volumetric flow rates of the dispersions and solutions through the upper, middle, and lower slots are shown below in Table 1. Table 1 also shows the coating speeds used for wet casting the multilayer films.

The extruded multilayer films were wet cast onto a 10-inch wide, 2-mil thick, polyimide liner (commercially available under the trade designation "KAPTON" from E.I. DuPont de Nemours and Company). Upon wet casting, the middle layers of the multilayer films underwent ionomer-induced phase separation. The multilayer films were then passed through a three-zone convection oven at a line speed of 0.9 meters/minute (three feet/minute) to evaporate the solvents and to lock the ionomer within the porous infrastructure of the porous polymer substrate. The three zones were respectively maintained at 60° C., 71° C., and 160° C. Following the drying operation, the resulting ICMs of Examples 1-8 were tested, as discussed below.

FIG. 6 is an SEM micrograph taken of the ICM of Example 1A. The layers shown on the top and bottom of FIG. 6 are layers of 3M 1000 PFSA ionomer. The central layer is a porous polymer substrate of polysulfone, which has a microporous infrastructure that is interpenetrated with 3M 1000 PFSA ionomer. The light regions of the central layer are the polysulfone and the darker regions are the micropores filled with 3M 1000 PFSA ionomer. The overall membrane thickness of the ICM of Example 1A was 16.5 micrometers, which consisted of a 2.5 micrometer polysulfone porous substrate sandwiched between two 7-micrometer layers of 3M 1000 PFSA ionomer. The average pore size of the microporous infrastructure was about 98 nanometers with a standard deviation of about 30 nanometers. As shown in FIG. 6, the 3M 1000 PFSA ionomer interpenetrates the polysulfone porous substrate in a substantially uniform manner. This allows the ICM of Example 1A to exhibit good proton conductivity.

Example 9

The ICM of Example 9 was prepared in the same manner as discussed above for Examples 1A-8, except that a dispersion of 20% 3M 800 PFSA was fed to the upper slot and a dispersion of 20% 3M 1000 PFSA was fed to the lower slot.

Examples 10 and 11

The ICMs of Examples 10 and 11 were prepared in the same manner as discussed above for Examples 1A-8, except that a solution of 21.8% polysulfone in NMP was fed to the middle slot instead of the 15% polysulfone/NMP solution. Additionally, the extruded multilayer films were wet cast onto a 6-inch wide, 2-mil thick, polyimide liner (commercially available under the trade designation "KAPTON" from E.I. DuPont de Nemours and Company).

Examples 12-14

The ICMs of Examples 12-14 were prepared in the same manner as discussed above for Examples 1A-8, except that a metastable ionomer/polysulfone solution was fed to the middle slot instead of the 15% polysulfone/NMP solution. The metastable solution included 14% 3M 1000 PFSA and 86% polysulfone, on a dry-weight basis.

TABLE 1 provides the volumetric flow rates of the upper, middle, and lower slots of the tri-die system, and the resulting coating speeds of the wet cast multilayer film for ICMs of Examples 1A-14.

TABLE 1

| Example | Upper slot flow rate (ml/min) | Middle slot flow rate (ml/min) | Lower slot flow rate (ml/min) | Coating speed (fpm) |
| --- | --- | --- | --- | --- |
| Example 1A | 23.4 | 4.1 | 23.4 | 10 |
| Example 1B | 23.4 | 4.1 | 23.4 | 10 |
| Example 2 | 23.4 | 8.0 | 23.4 | 5 |
| Example 3 | 24.0 | 8.0 | 24.0 | 5 |
| Example 4 | 24.0 | 5.0 | 24.0 | 5 |
| Example 5 | 24.0 | 5.0 | 24.0 | 10 |
| Example 6 | 40.0 | 5.0 | 40.0 | 5 |
| Example 7 | 23.4 | 8.1 | 23.4 | 10 |
| Example 8 | 24.0 | 5.0 | 24.0 | 10 |
| Example 9 | 24.0 | 5.0 | 24.0 | 10 |
| Example 10 | 23.4 | 8.0 | 23.4 | 5 |
| Example 11 | 23.4 | 6.0 | 23.4 | 5 |
| Example 12 | 24.0 | 10.0 | 24.0 | 10 |
| Example 13 | 24.0 | 10.0 | 24.0 | 5 |
| Example 14 | 40.0 | 10.0 | 40.0 | 10 |

Examples 15 and 16

The ICMs of Examples 15 and 16 each involved a five-layer ICM, which was prepared by joining two ICMs of Example 9. The ICM of Example 15 was prepared by wet casting a second multilayer film on top of the ICM of Example 9 with the tri-die system discussed above for Examples 1A-8. The second multilayer film was wet cast with a dispersion of 20% 3M 800 PFSA fed to the lower slot and a dispersion of 20% 3M 1000 PFSA fed to the upper slot to ensure continuity of the low equivalent weight material. The resulting five-layer film was then re-passed through the convection oven.

The ICM of Example 16 was prepared by laminating two pre-formed ICMs of Example 9 with a fuel cell lamination technique. This involved releasing each of the ICM's of Example 9 from the respective polyimide liners by immersion in ambient water. The ICM's of Example 9 were then placed between a pair of 50-micrometer silicone liner sheets. The resulting assembly was then introduced between two rolls in a hot roll laminator where the top roll is preheated at 140° C., the bottom roll at 132° C., and the pressure is set at 3.4 MegaPascals (about 500 pounds/inch$^2$), thereby forming the ICM of Example 16 disposed between the silicone liner sheets.

The ICMs of Example 9 each had a membrane thickness of about 15 micrometers. After the secondary joining steps to form the ICMs of Examples 15 and 16, the ICMs of Examples 15 and 16 each had layers thicknesses of about 30 micrometers. The ICMs of Examples 15 and 16 each contained a core layer of 3M 800 PFSA ionomer, which was sandwiched between a pair of interpenetrated polysulfone substrates, which themselves were between a pair of outer layers of 3M 1000 PFSA ionomer. As such, the ICMs of Examples 15 and 16 each represent a five-layer ICM that has a lower equivalent weight ionomer in the core layer and higher equivalent weight ionomers in the outer ionomer layers.

Tear Strength Testing of Examples 1A-7 and 10-14

The tear strengths of the ICMs of Examples 1A-7 and 10-14 were quantitatively measured pursuant to ASTM D882-95, which included sample dimensions of a 5-centimeter (cm) length, a 2-cm width, a 15-50 micrometer layer thickness, and 0.2-0.8-cm ligaments. The strain rate was two millimeters/minute, and the process conditions included a temperature of 25° C., 50% relative humidity, and a temperature of 50° C., 95% relative humidity. Table 2 provides the tear strength results in MegaPascals (MPa) for the ICMs of Examples 1A-7 and 10-14.

TABLE 2

| Example | Tear Strength (MPa) |
| --- | --- |
| Example 1A | 9.0 |
| Example 1B | 7.5 |
| Example 2 | 10.9 |
| Example 3 | 9.5 |
| Example 4 | 7.0 |
| Example 5 | 5.9 |
| Example 6 | 8.0 |
| Example 7 | 10.0 |
| Example 10 | 10.5 |
| Example 11 | 6.0 |
| Example 12 | 9.1 |
| Example 13 | 7.7 |
| Example 14 | 5.1 |

Figure 7:
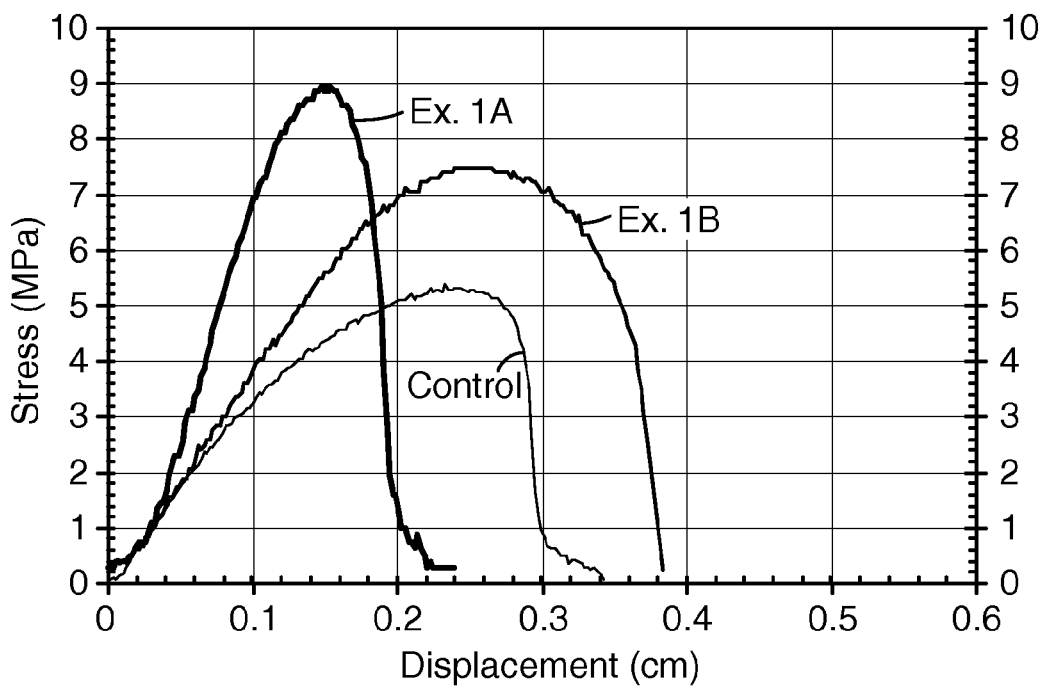
FIG. 7 is a graphical representation of tear strength results measured for exemplary ICMs of the present invention and a control membrane.

FIG. 7 is a graph of tear strength profiles measured for ICMs of Examples 1A and 1B, and a control membrane (comparative example) that is not mechanically reinforced. The data in Table 2 and FIG. 7 illustrate the good tear strengths of the ICMs of Examples 1A-7 and 10-14. In particular, the ICM's of Examples 2, 7, and 10 exhibited high tear strengths. The increased tear strengths result from the use of the reinforcement polymers in the porous polymer substrates. The polysulfone porous substrates mechanically reinforce the ICMs of the present invention, thereby reducing the risk of damage to the ICMs during manufacture and use.

Fuel Cell Testing of Examples 1A, 1B, 4, 5, 8, 9, 12, 15, and 16

The ICMs of Examples 1A, 1B, 4, 5, 8, 9, 12, 15, and 16 were quantitatively measured for conductivity pursuant to the following procedure. Each ICM was placed in the fuel cell station, which was maintained at 70° C. and 100% relative humidity. Hydrogen ($H_2$) gas streams were introduced on the anode and cathode sides, each at flow rates of 640 standard cubic centimeters per minute, and were each maintained at ambient pressures 0 psig. A current sweep was then performed on the ICM, which increased from 0.1 amps/cm$^2$ to 0.7 amps/cm$^2$ in 0.05 amp/cm$^2$ increments (25 seconds/point). The current sweep was repeated four times and the voltage vs. current was plotted, where the slope of the plot represents the resistance. Table 3 provides the current density results of the fuel cell tests at cell potentials of 0.8 volts and 0.6 volts.

TABLE 3

| Example | Current Density (amps/cm$^2$) at 0.8 volts | Current Density (amps/cm$^2$) at 0.6 volts |
| --- | --- | --- |
| Example 1A | 0.295 | 0.820 |
| Example 1B | 0.238 | 0.516 |

TABLE 3-continued

| Example | Current Density (amps/cm$^2$) at 0.8 volts | Current Density (amps/cm$^2$) at 0.6 volts |
|---|---|---|
| Example 4 | 0.159 | 0.505 |
| Example 5 | 0.170 | 0.588 |
| Example 8 | 0.255 | 0.755 |
| Example 9 | 0.255 | 0.795 |
| Example 12 | 0.058 | 0.235 |
| Example 15 | 0.022 | 0.178 |
| Example 16 | 0.179 | 0.560 |

The data in Table 3 illustrates the good current densities of the ICMs of Examples 1A, 1B, 4, 5, 8, 9, 12, 15, and 16. The current densities are attainable because the ionomers (e.g., the 3M 800 PFSA and the 3M 1000 PFSA) interpenetrate within the polysulfone porous substrate via ionomer-induced phase separation. This allows polysulfone porous substrates used in the ICMs of the present invention to transfer protons, rather than functioning as barriers to proton transfer. In particular, the ICMs of Examples 1A, 1B, 8, and 9 outperformed in conductivity with hydrogen pump values below 100 mohm-cm$^2$ due to enhanced ionomer interpenetration within the polysulfone porous substrate. In addition, an accelerated durability test using a SHIVA fuel cell station that measures total fluoride ion release gave a lifetime of about 350 hours for the ICM of Example 1A, slightly lower than the lifetime on a 1.2 mil 800-equivalent weight non-reinforced membrane.

Figure 8:
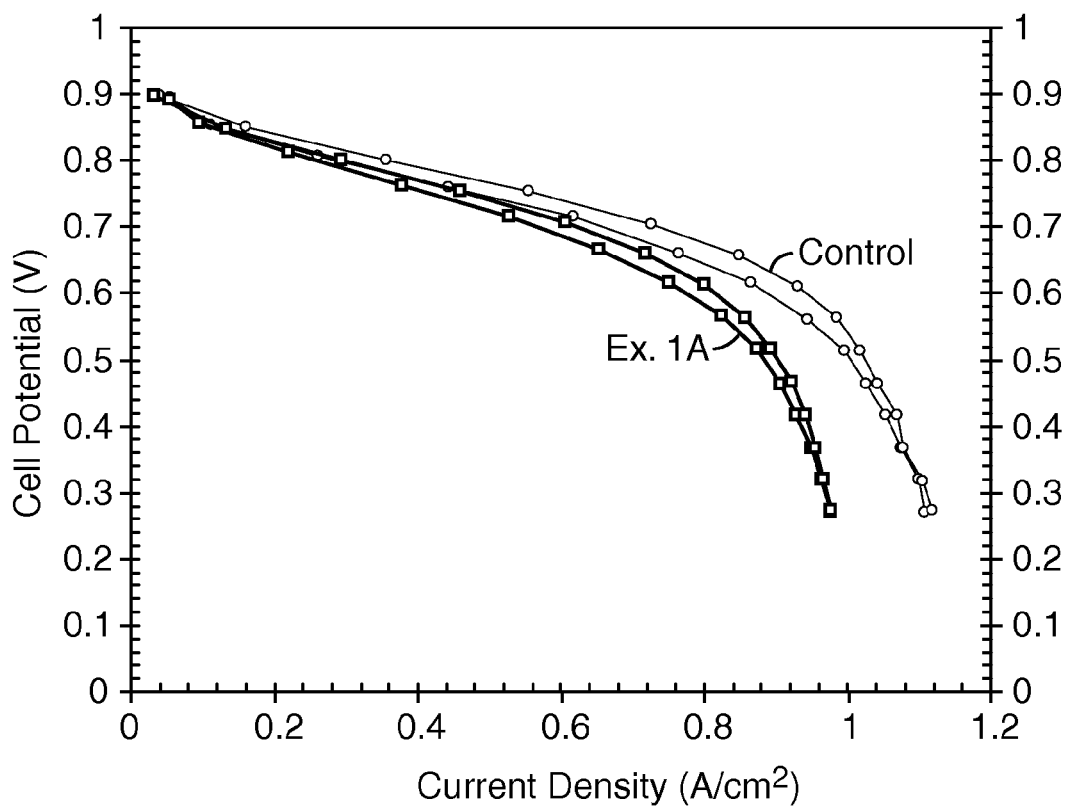
FIG. 8 is a graphical representation of fuel cell testing results measured for an exemplary ICM of the present invention and a control membrane.

FIG. 8 is a graph of cell potential versus current density for the ICM of Example 1A and a control membrane (comparative example) that is not mechanically reinforced. As shown, the ICM of Example 1A exhibits similar proton conductivity to the control membrane. However, as discussed above, the ICM of Example 1A also exhibits good tear strengths due to the reinforcement of the polysulfone porous substrate. Because the control membrane is not mechanically reinforced, it would have a low structural integrity. In contrast, the ICMs of the present invention exhibit good proton conductivity, while also being mechanically reinforced by the polysulfone porous substrate. As a result, the ICMs of the present invention are robust membranes suitable for use in a variety of electrochemical devices, such as fuel cells.

Although the present invention has been described with reference to preferred embodiments, workers skilled in the art will recognize that changes may be made in form and detail without departing from the spirit and scope of the invention.

The invention claimed is:

1. A method of forming an ion-conductive membrane, the method comprising:
    coating a first layer adjacent to a second layer, wherein the first layer comprises a first ionomer dispersed in a first solvent, and wherein the second layer comprises a reinforcement polymer substantially dissolved in a second solvent; and
    initiating an ionomer-induced phase separation of the reinforcement polymer from the second solvent, thereby forming a porous polymer substrate from the reinforcement polymer and interpenetrating a portion of the first ionomer within the porous polymer substrate.

2. The method of claim 1, wherein the second layer further comprises a second ionomer.

3. The method of claim 1, wherein the step of coating the first layer adjacent to the second layer comprises coextruding the first layer and the second layer.

4. The method of claim 1, wherein the first ionomer comprises a sulfonated fluoropolymer.

5. The method of claim 1, wherein the reinforcement polymer comprises a material selected from the group consisting of polysulfones, polyether imides, and combinations thereof.

6. The method of claim 1, further comprising coating the second layer with a third layer on an opposing surface of the second layer from the first layer, the third layer comprising a second ionomer dispersed in a third solvent, wherein the ionomer-induced phase separation further interpenetrates a portion of the second ionomer within the porous polymer substrate.

7. A method of forming an ion-conductive membrane, the method comprising the steps of:
    a) coating a first substrate layer having a first surface and a second surface from a first solution, the first solution comprising a reinforcement polymer substantially dissolved in a first solvent;
    b) coating a first ionomer layer adjacent the first surface of the substrate layer, the first ionomer layer comprising a first ionomer;
    c) coating a second ionomer layer adjacent the second surface of the substrate layer, the second ionomer layer comprising a second ionomer; and
    d) initiating an ionomer-induced phase separation of the reinforcement polymer from the first solvent, thereby forming a porous polymer substrate from the substrate layer and interpenetrating a portion of the first ionomer and a portion of the second ionomer within the porous polymer substrate.

8. The method of claim 7, wherein the first substrate layer, the first ionomer layer, and the second ionomer layer are coextruded.

9. The method of claim 7, further comprising the steps of:
    e) coating a second substrate layer having a first surface and a second surface from a second solution, the second solution comprising a second reinforcement polymer substantially dissolved in a second solvent;
    f) coating a third ionomer layer adjacent the first surface of the second substrate layer, the third ionomer layer comprising a third ionomer;
    g) coating a fourth ionomer layer adjacent the second surface of the second substrate layer, the fourth ionomer layer comprising a second ionomer;
    wherein third ionomer layer is coated adjacent the second ionomer layer.

10. The method of claim 9 wherein step d) of initiating an ionomer-induced phase separation of the reinforcement polymer from the first solvent is carried out after step e) of coating a second substrate layer.

11. The method of claim 9 wherein step d) of initiating an ionomer-induced phase separation of the reinforcement polymer from the first solvent is carried out before step e) of coating a second substrate layer.

12. The method of claim 9, wherein the first substrate layer, the first ionomer layer, the second ionomer layer, the second substrate layer, the third ionomer layer, and the fourth ionomer layer are coextruded.

13. The method of claim 9, further comprising the step of:
    h) initiating an ionomer-induced phase separation of the second reinforcement polymer from the second solvent, thereby forming a second porous polymer substrate from the second substrate layer and interpenetrating a portion of the third ionomer and a portion of the fourth ionomer within the second porous polymer substrate.

14. A method comprising the step of laminating an ion-conductive membrane made according to the method of claim 1 with a second ion-conductive membrane.

15. A method comprising the step of laminating an ion-conductive membrane made according to the method of claim 7 with a second ion-conductive membrane.

* * * * *